United States Patent
Katsuki et al.

(10) Patent No.: US 10,740,634 B1
(45) Date of Patent: Aug. 11, 2020

(54) DETECTION OF DECLINE IN CONCENTRATION BASED ON ANOMALY DETECTION

(71) Applicant: INTERNATIONAL BUSINESS MACHINES CORPORATION, Armonk, NY (US)

(72) Inventors: Takayuki Katsuki, Tokyo (JP); Kun Zhao, Chiba (JP); Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/427,666

(22) Filed: May 31, 2019

(51) Int. Cl.
*G06K 9/00* (2006.01)
*G06K 9/62* (2006.01)

(52) U.S. Cl.
CPC ......... *G06K 9/00845* (2013.01); *G06K 9/629* (2013.01); *G06K 9/6289* (2013.01)

(58) Field of Classification Search
CPC .... G06K 9/00845; B60K 28/02; B60K 28/06; B60W 40/08; B60W 2040/0827; B60W 2040/0872; B60W 40/09
See application file for complete search history.

(56) References Cited

U.S. PATENT DOCUMENTS

| 2009/0040054 | A1 | 2/2009 | Wang et al. |
| 2015/0119732 | A1* | 4/2015 | Wisbey ............. A61B 5/02405 600/508 |
| 2015/0266485 | A1 | 9/2015 | Prakah-Asante et al. |
| 2017/0001520 | A1 | 1/2017 | Nemat-Nasser |

FOREIGN PATENT DOCUMENTS

WO 2018167991 A1 9/2018

* cited by examiner

*Primary Examiner* — Curtis B Odom
(74) *Attorney, Agent, or Firm* — Tutunjian & Bitetto, P.C.; Vazken Alexanian

(57) ABSTRACT

A computer-implemented method is disclosed. The method includes preparing a base of an anomaly detection model for generating a score that indicates an estimation of a concentration decline. The anomaly detection model has parameters affecting the score. The method also includes preparing a set of training data, each of which includes a sequence of sensor data relating to activity performed by an individual. The method also includes optimizing the parameters of the anomaly detection model using the set of the training data so as to make a score for longer cumulative activity high as compared to shorter cumulative activity. The method further includes outputting the parameters of the anomaly detection model, in which the anomaly detection model having the parameters is used for detecting a concentration decline of a target individual.

20 Claims, 8 Drawing Sheets

DETECTION OF DECLINE IN CONCENTRATION BASED ON ANOMALY DETECTION

BACKGROUND

The present disclosure, generally, relates to a concentration decline detection, more particularly, to a technique of detecting a decline in concentration of an individual using anomaly detection.

Detecting factors and events that could cause an accident, including a decline in concentration (power) due to tiredness and drowsiness, dangerous driving and device failure, is a challenging task in automotive industry. In particular, growing attention is being paid to detecting a decline in concentration of a driver since it is helpful to prevent traffic accidents, health damage of drivers, and to perform a safe driving diagnosis. A driving recorder is one of major flexible IoT (Internet of Thing) devices equipped in the automobile.

SUMMARY

According to an embodiment of the present invention, a computer-implemented method is provided. The method includes preparing a base of an anomaly detection model for generating a score that indicates an estimation of a concentration decline, in which the anomaly detection model has parameters that affect the score. The method also includes preparing a set of training data, each of which includes a sequence of sensor data relating to activity performed by an individual. The method includes also optimizing the parameters of the anomaly detection model using the set of the training data so as to make a score for longer cumulative activity high as compared to shorter cumulative activity. The method further includes outputting the parameters of the anomaly detection model, in which the anomaly detection model having the parameters is used for detecting a concentration decline of a target individual.

According to other embodiment of the present invention, a computer-implemented method is provided. The computer-implemented method includes preparing an anomaly detection model for generating a score that indicates an estimation of a concentration decline. The anomaly detection model has parameters that affect the score and have been optimized with a set of training data so as to make a score for longer cumulative activity high as compared to shorter cumulative activity. The computer-implemented method includes also receiving input data including sensor data relating to activity performed by a target individual. The computer-implemented method further includes calculating a score for the input data using the anomaly detection model having the parameters. The computer-implemented method includes further outputting a result based on the score.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Hereinafter, the present invention will be described with respect to particular embodiments, but it will be understood by those skilled in the art that the embodiments described below are mentioned only by way of examples and are not intended to limit the scope of the present invention.

One or more embodiments according to the present invention are directed to computer-implemented methods, computer systems and computer program products for detecting a concentration decline of a target individual from sensor data relating to activity performed by the target individual by using an anomaly detection model, in which the concentration decline to be detected is a concentration decline of the target individual when driving an automobile and the activity reflected in the sensor data is driving performed by the target individual.

Hereinafter, first referring to FIGS. 1, 2, 3, and 4, a computer system for detecting a concentration decline of a target driver according to an exemplary embodiment of the present invention will be described. Then, referring to FIG. 5, a method for detecting a concentration decline of a target driver according to an exemplary embodiment of the present invention will be described. Then, with reference to FIG. 6 and FIG. 7, exemplary embodiments of systems implementing the driver concentration decline detection system according to one or more embodiments of the present invention will be described. Finally, referring to FIG. 8, a hardware configuration of a computer system according to one or more embodiments of the present invention will be described.

Hereinafter, referring to FIG. 1, a block diagram of a driver concentration decline detection system 100 according to an exemplary embodiment of the present invention is described.

Figure 1:
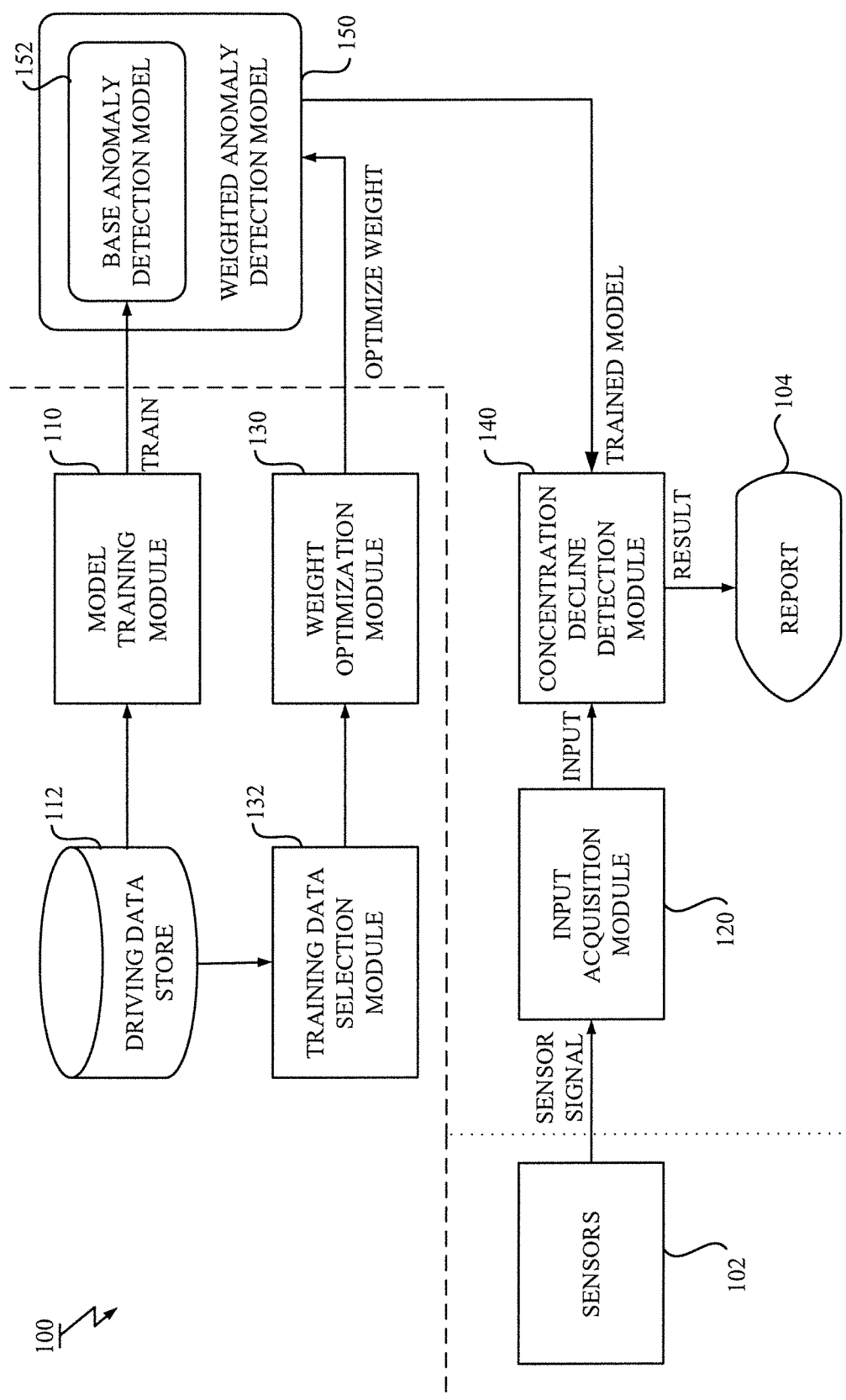
FIG. 1 illustrates a block diagram of a driver concentration decline detection system for detecting a concentration decline of a target driver according to an exemplary embodiment of the present invention.

As shown in FIG. 1, the driver concentration decline detection system 100 includes sensors 102 for generating sensor signals; an input acquisition module 120 for acquiring the sensor signals from the sensors 102; a model training module 110 for training a base anomaly detection model 152 that is a base of a model for concentration decline detection; and a driving data store 112 for storing a collection of driving data of a driver (e.g., a variety of drivers), which is used to train the base anomaly detection model 152.

The driver concentration decline detection system 100 also includes a weight optimization module 130 for training a weighted anomaly detection model 150 that includes the base anomaly detection model 152 as a part thereof; and a training data selection module 132 for selecting, from among the collection of the driving data stored in the driving data store 112, a plurality of driving data as a set of training data, which is passed to the weight optimization module 130 for use in training of the weighted anomaly detection model 150.

The driver concentration decline detection system 100 further includes a concentration decline detection module 140 for performing concentration decline detection based upon the weighted anomaly detection model 150; and an output device 104 for outputting a result of the concentration decline detection done by the concentration decline detection module 140.

The sensors 102 may include one or more sensors, each of which is configured to output a sensor signal. The sensor signals are then transmitted to the subsequent input acquisition module 120. The sensor signal generated by one of the sensors 102 is generated in the form of either an analog signal or a digital signal, however, is acquired by the input acquisition module 120 in the form of the digital signal with a predetermined sampling frequency.

In one or more embodiments, any mechanical sensors that measures mechanical properties such as inertia, force and displacement, physical sensors that measure physical properties such as magnetic field and other sensors that measures other properties relating to driving of an automobile is preferably employed as one of the sensors 102.

More specifically, the sensors 102 may include one or more sensors selected from a group including an accelerometer for measuring one or more accelerations (e.g., x, y and z accelerations for a three-axis accelerometer); a gyroscope for measuring one or more angular velocities (e.g., roll, pitch and yaw axes angular velocities for a three-axis gyroscope); a speedometer for measuring (instantaneous) vehicle speed; a steering angle sensor for measuring a steering (wheel position) angle; a GPS (Global Positioning System) sensor for measuring latitude, longitude, height, vehicle speed and/or vehicle heading angle; a magnetometer such as a miniaturized microelectromechanical systems (MEMS) magnetometer for measuring azimuth and/or inclination; an accelerator pedal position sensor for measuring a depression amount and/or depression speed of an accelerator pedal; a throttle position sensor for measuring a position of a throttle valve; and a brake pedal position sensor for measuring a depression amount and/or depression speed of a brake pedal.

Each of the aforementioned sensors may be embedded in any automotive electronics such as an automotive navigation system and a driving recorder. Note that the driving recorder includes a dashboard camera, which is purchased from the automotive aftermarket and installed into an automobile after the sale of the automobile, and an event data recorder (EDR), which may be installed by a manufacturer into an automobile (e.g., in a restraint system control module) before the sale of the automobile.

One or more sensors that are available to the drive recorder are preferably employed as the sensors 102. The usage of data available to the drive recorder makes it the detection possible with a low cost.

The input acquisition module 120 is configured to acquire the sensor signals transmitted from the sensors 102 to obtain driving data. The driving data includes a sequence of sensor data relating to driving performed by a target driver and is then used for the concentration decline detection. Note that the target driver refers to a driver for whom concentration decline detection is to be performed.

One driving data may include a sequence of vectors in time order (i.e., time series), in which each vector is sensor data recorded at a predetermined recording frequency (e.g., 1 Hz). Each vector includes a plurality of values of sensor variables selected from a group including accelerations of x, y and z axes, angular velocities of roll, pitch and yaw axes, a vehicle speed, a vehicle heading angle, a steering angle, latitude, longitude, height, an azimuth, a depression amount and a depression speed of an accelerator pedal, a position of a throttle valve, a depression amount and a depression speed of a brake pedal, and processed values obtained from these recorded values.

The processed values may be obtained by processing any one of the aforementioned recorded values. The way of processing or conversion to obtain the process value may include, but is not limited to, differentiation, integration, computing difference, moving average, Fourier transform, to name but a few. For example, such processed values include vehicle velocity, azimuth difference and jolt. The vehicle velocity is time integration of the acceleration. The azimuth difference is difference in azimuth between two points of time and relates to velocity of the azimuth. The jolt is a rate of change of the acceleration for an axis (x, y, z-axis acceleration-based jolts that are time derivatives of the x, y, z-axis accelerations, respectively). To calculate the processed values from the recorded values, a timestamp associated with each vector may be used.

Furthermore, the aforementioned processing or conversion may be applied multiple times to the recorded value. For example, the jolt may be obtained as second time derivative of the vehicle speed (speed-based jolt). Acceleration in the azimuth may be obtained as second time derivative of the azimuth. Also, the processed value may be represented in a linear scale or log scale. Components of a plurality of axes may be treated separately as a vector, or may be treated together as magnitude or absolute value of the vector. Furthermore, each vector may preferably include a plurality of recorded values and/or processed values obtained at different timings.

Non-limiting examples of the processed values other than the aforementioned processed values may include speed based acceleration that is time derivative of the vehicle speed; longitude and latitude based velocity that is a vector of time derivatives of longitude and latitude; and longitude and latitude based jolt that is a vector of third time derivatives of longitude and latitude.

Note that two of the recorded and processed values may be related to and complementary to each other. For example, the jolt for an axis of travel direction of the automobile (a time derivative of the x-axis acceleration) relates to depression speeds of the brake and acceleration pedals. Although there is no obstruction to using in combination, the information of the depression speed of the acceleration and brake pedals may be omitted when the accelerations are available.

The vehicle velocity, which is time integration of accelerations, along with the axis of the travel direction of the automobile relates to the vehicle speed measured by the speedometer. Thus, although there is no obstruction to using in combination, the information of the vehicle speed measured by the speedometer may be omitted when the accelerations are available. Also, the azimuth relates to a steering angle. Thus, although there is no obstruction to using in combination, the information of the steering angle may be omitted when the azimuth is available.

In a preferable embodiment, a combination of the speed based jolt (processed value), the speed based acceleration (processed value), the z-acceleration based jolt (processed value); the vehicle speed (recorded value), the acceleration in the azimuth (processed value), the y-axis acceleration (recorded value), the longitude and latitude based velocity (processed value) and the longitude and latitude based jolt (processed value) is used.

Note that image data, image related information, audio data, audio related information, which need more computational resources (for image processing, sound processing) and/or extra devices (e. g, a facial camera, an image processing circuit, a microphone, an audio processing circuit, etc.) are excluded from the driving data even when the image data is available in the dashboard camera.

Note that the recording frequency may be different from the sampling frequencies of the sensors 102. In such case, the driving data is configured to have a sequence of vectors having predetermined time intervals aligned across multiple sensors by performing interpolation based on timestamps associated with each vector or respective sampling frequencies.

The driving data store 112 is configured to store a collection of a plurality of driving data. A format of the driving data stored in the driving data store 112 may be the same as the driving data acquired by the input acquisition module 120. The plurality of the driving data may be obtained from a variety of drivers with different skills when applying the model 150 to multiple drivers. The driving data of the variety of the drivers may have been collected from a plurality of automobiles (each of which includes sensors corresponding to the sensors 102) actually running on roads. Furthermore, the plurality of the driving data may be obtained from a target driver when the model 150 is customized for a specific target driver (a single driver or a few drivers) in local environment (an owner or user of the automobile, their family such as a spouse, a child and a parent, or a member of their organization, etc.). The driving data of the target driver may be collected by the input acquisition module 120 while the target driver in the local environment drives, on roads, the automobile including the sensors 102.

Each driving data stored in the driving data store 112 includes an episode of driving performed by one driver, and contains a sequence of vectors from the start of the driving to the end of the driving. In a particular embodiment, the driving data may be separated at positions of an engine start, an engine stop and relatively long term parking without moving (with engine idling), during which the driver can have enough rest to restore his/her concentration or the driver can be changed to a different driver who may have sufficiently rested. Note that the engine stop and start do not include a shutdown of an engine by a start-stop system and restart of the engine by the start-stop system, respectively. The engine start indicates a start of a new driving episode and may initiate recording of the sensor signals of the sensors 102. The engine stop indicates an end of the driving episode and may terminate the recording of the sensor signals of the sensors 102. The start of the long term parking with engine idling, which appears as a long period of approximately zero speed, indicates an end of the driving episode whereas the end of the long term parking with engine idling indicates a start of a new driving episode.

The model training module 110 is configured to train an anomaly detection model using the driving data stored in the driving data store 112 to prepare the base anomaly detection model 152. The base anomaly detection model 152 is a base of the weighted anomaly detection model 150 for concentration decline detection, as will be described later in more detail.

In a particular embodiment, a set of normal driving data that is driving data without record of indicating a concentration decline (e.g., tiredness, drowsiness) is used for training the base anomaly detection model 152. The indication of the concentration decline of the driver may be given explicitly or implicitly in each driving data. For example, driving data associated with a label indicating explicitly no feeling of a concentration decline during the driving episode may be used as the normal driving data. Also driving data with driving time less than a threshold (e.g., 1 hour) may be used as the normal driving data since the driver is less likely to get tired in a short driving. To train the base anomaly detection model 152, the set of the normal driving data may be preferably used. However, there is no obstruction to use driving data with record of indicating the concentration decline.

The base anomaly detection model 152 is an anomaly detection model for generating a temporary anomaly score for each sensor variable and each point of time in a given input of driving data. The base anomaly detection model 152 is a kind of unsupervised model since it does not need correct label information discriminating an anomalous region where the driver feels concentration decline (e.g., tiredness and drowsiness) from a normal region where the driver does not feel any concentration decline in an episode.

The training data selection module 132 is configured to prepare a set of training data from among the driving data stored in the driving data store 112. The training data prepared by the training data selection module 132 is used for weight optimization of the weighted anomaly detection model 150. The set of the training data is prepared by selecting one or more driving data based on a data selection condition for extracting a driving episode that contains, at least in part, an anomalous region where the driver could feel concentration decline.

In a particular embodiment, a set of driving data with record of indicating concentration decline (e.g., tiredness, drowsiness) is used for weight optimization of the weighted anomaly detection model 150. As described above, the indication of the concentration decline may be given explicitly or implicitly in each driving data. For example, driving data associated with a label indicating explicitly feeling of concentration decline at least in part of driving may be used as training data (driver's self-reported information). Also driving data with driving time more than a threshold (the threshold for extracting the training data may be same as or different from the threshold for extracting the normal driving data for training the base anomaly detection model 152) may be used as training data since it is common sense that long driving generally brings fatigue to drivers. Furthermore, other data selection condition with respect to time of day may also be used since driving early morning or midnight would cause drowsiness. Note that selection of the training data does not need correct label information indicating an anomalous region where the driver feels concentration decline within a whole episode. Although the indication of the concentration decline indicates that there is a feeling of concentration decline during the driving episode at least in part, it does not necessarily to indicate an exact anomalous region where the driver feels concentration decline.

The weight optimization module 130 is configured to train the weighted anomaly detection model 150 with the training data selected by the training data selection module 132. The weighted anomaly detection model 150 is an anomaly detection model for generating a weighted anomaly score over plural sensor variables for each point of time in a given input of driving data. The weighted anomaly score generated by the weighted anomaly detection model 150 is a final score indicating an estimation of a concentration decline of the target driver. The weighted anomaly detection model 150 includes the base anomaly detection model 152 as a part thereof and has weights associated with the base anomaly detection model 152 as parameters affecting the final score.

In the described embodiment, the weight optimization module 130 is configured to optimize the weights of the weighted anomaly detection model 150 using the set of the training data so as to make a weighted anomaly score calculated for longer cumulative driving high as compared to shorter cumulative driving. It is based upon an assumption that a concentration decline of a driver is gradually accumulated over time during driving since the long driving would bring fatigue or drowsiness to the driver.

In the described embodiment, the cumulative driving is measured by driving time from the start of driving to a point of time. Note that driving time does not mean a time of continuous driving without stopping. The driving time may include a short period of stopping such as a traffic signal waiting time. The driving time at two points of time may be comparative by a timestamp or an index associated to a vector in the sequence of one driving data. Alternatively, the cumulative driving is measured by driving distance from the start of driving to a point of a location. The driving distance between two points may be comparative by distance along a path from the start point to the point of the location, which may be measured by integral of the vehicle speed over time or difference in values of a trip meter if available. Although the driving time and the driving distance are mentioned, however, other metric may also be contemplated as long as it quantifies the degree of the cumulative driving.

After the optimization of the weights is completed, the weight optimization module 130 is configured to output the weights of the weighted anomaly detection model 150 into a storage device, for example. The weighted anomaly detection model 150 trained by the weight optimization module 130 would be used by the concentration decline detection module 140 for detecting the concentration decline of the target individual.

In a particular embodiment, the weighted anomaly detection model 150 is trained at a side of a vender of an apparatus implementing the system 100 (e.g., a driving recorder) prior to shipment of the apparatus. Thus, the weighted anomaly detection model 150 may be fixed after shipment. However, the weighted anomaly detection model 150 may be updated with firmware update after shipment. Alternatively, the weighted anomaly detection model 150 may be updated at a side of a user of the apparatus by using a new set of driving data acquired in the local environment. For example, the weights of the weighted anomaly detection model 150 may be updated each time the training data is available (online learning).

Furthermore, the parameters of the base anomaly detection model 152 and the weights associated with the base anomaly detection model 152 may be trained at the same side or different sides. In a particular embodiment, the base anomaly detection model 152 is trained at the side of the vender using driving data obtained from a variety of drivers and the weights of the weighted anomaly detection model 150 are optimized at the side of the user with the driving data of merely the target driver acquired in the local environment.

In an inference phase, the input acquisition module 120 is configured to acquire input driving data from the sensors 102, which includes a sequence of sensor data relating to driving performed by the target driver, and to pass the driving data to the concentration decline detection module 140 sequentially. Note that the input driving data may also be used as the training data when online learning is performed.

The concentration decline detection module 140 is configured to prepare the weighted anomaly detection model 150 on a memory by reading parameters of the weighted anomaly detection model 150 (including the parameters of the base anomaly detection model 152 and the weights associated therewith) in response to the system 100 being started up in the inference mode. The concentration decline detection module 140 is configured to receive the input driving data from the input acquisition module 120 and to detect, for the input driving data, a concentration decline using the weighted anomaly detection model 150. More specifically, the concentration decline detection module 140 is configured to calculate the weighted anomaly score based upon the weighted anomaly detection model 150 and to judge whether or not the weighted anomaly score indicates the concentration decline. In the described embodiment, the judgement as to whether the weighted anomaly score indicates the concentration decline or not is performed in a manner based upon a predetermined detection condition related to the weighted anomaly score.

The output device 104 is configured to output a result of the concentration decline detection based on the weighted anomaly score calculated by the concentration decline detection module 140. In a particular embodiment, the result may indicate a concentration decline for a point of time in the given input driving data when the predetermined detection condition related to the weighted anomaly score is satisfied. Note that the input driving data for which a concentration decline is detected may be used as training data when online learning is performed. More detail about the predetermined detection condition related to the weighted anomaly score will be described later. In other embodiment, the result includes the weighted anomaly score itself as an estimation of a risk of concentration decline.

In a particular embodiment, the result of the concentration decline detection may be an alert or notification indicating that a decline in concentration power of the target driver has been detected. The output device 104 may be any one of known output devices including, but is not limited to, a display, a speaker, a light indicator, a printer, a storage, etc. The alert or notification may be emitted in a form of sound, voice, text, image or light pattern, etc.

In a particular embodiment, the detection of the concentration decline may be conducted for input driving data as an ongoing episode. In this particular embodiment, the input driving data includes a sequence of vectors from a start of driving to the present of the detection and the weighted anomaly score is calculated for a point of time of detection or present. Thus, the detection of the concentration decline may be performed in real-time. By alerting the driver when the weighted anomaly score satisfies the predetermined detection condition, which indicates the detection of the concentration decline, it becomes possible to prevent a traffic accident in advance.

In other particular embodiment, the detection of the concentration decline may be conducted for input driving data as a complete episode including a sequence of vectors from a start of driving to an end of the driving. In this particular embodiment, the weighted anomaly score is calculated for each point of time in the episode and one or more periods where the concentration decline is detected are extracted or marked. By identifying a period where the concentration decline of the driver occurs, it becomes possible to conduct more precise accident analysis after traffic accidents.

Figure 2:
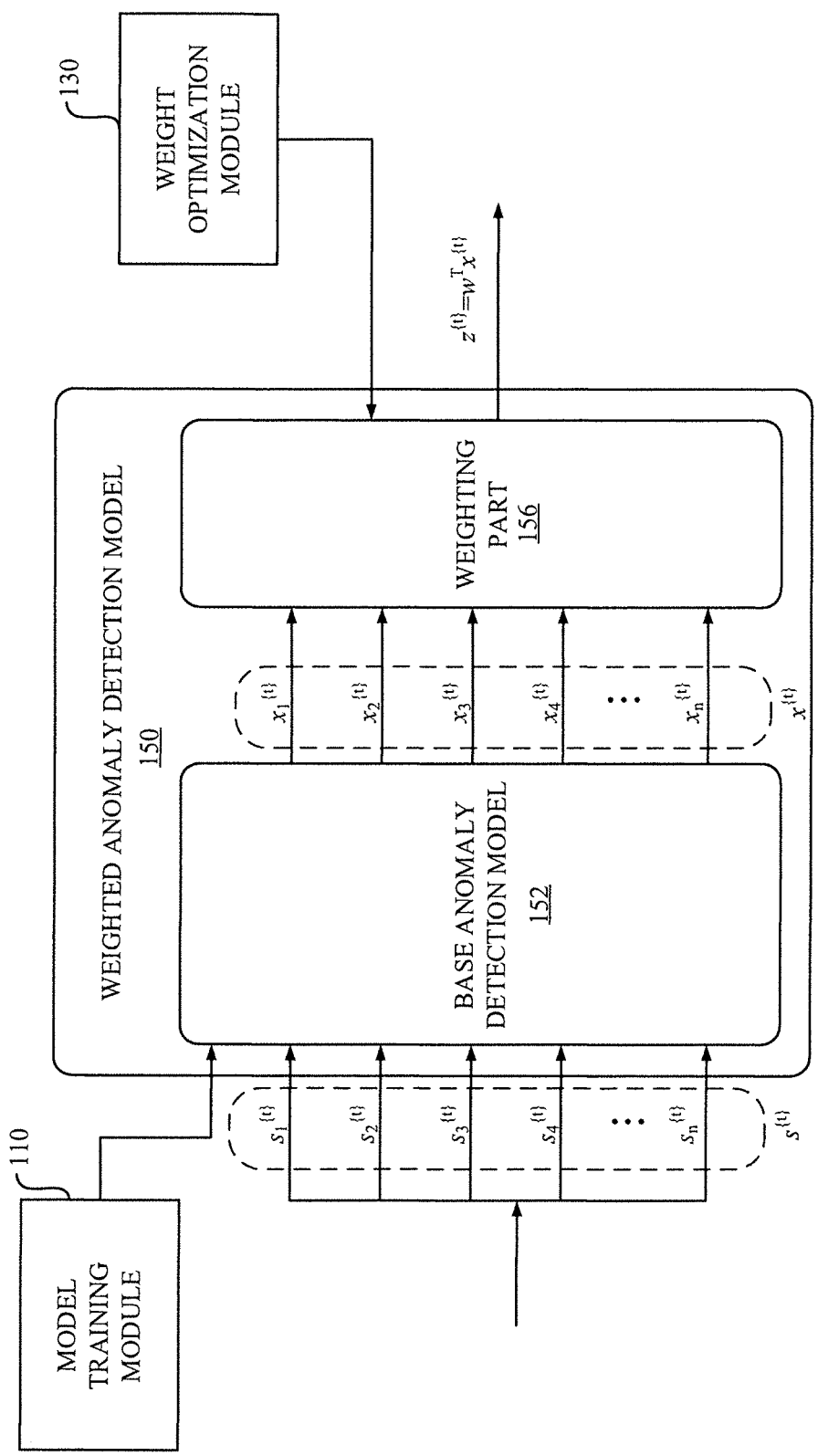
FIG. 2 illustrates a detailed block diagram of a model for detecting a concentration decline of a target driver according to the exemplary embodiment of the present invention.

With reference to FIG. 2, the weighted anomaly detection model 150 for detecting the concentration decline of the target driver is described in more detail. As shown in FIG. 2, the weighted anomaly detection model 150 includes the base anomaly detection model 152 that is trained by the model training module 110 and a weighting part 156 having the weights that are optimized by the weight optimization module 130.

As described above, the sensor data for each point of time (t) includes a set of values over plural sensor variables ($s^{\{t\}} = \{s_1^{\{t\}}, s_2^{\{t\}}, \ldots, s_n^{\{t\}}\}$), each of which corresponds to one of the recorded and processed values. Note that n represents the number of the sensor variables in an input vector. The base anomaly detection model 152 is a base part for computing a set of temporary anomaly scores for plural sensor variables (anomaly score per variables) ($x^{\{t\}} = \{x_1^{\{t\}}, x_2^{\{t\}}, \ldots, x_n^{\{t\}}\}$) for each point of time (t). The weighting part 156 is a part for weighting the temporary anomaly scores ($x^{\{t\}} = \{x_1^{\{t\}}, x_2^{\{t\}}, \ldots, x_n^{\{t\}}\}$) with the weights ($w = \{w_1, w_2, \ldots, w_n\}$) to generate the final weighted anomaly score as a weighted sum of the temporary anomaly scores ($z^{\{t\}} = w^T x^{\{t\}}$).

Note that in the described embodiment the number of the temporary anomaly scores generated by the base anomaly detection model 152 and accordingly the number of the weights are the same as the number of the sensor variables in the input vector (n). However, the number of the temporary anomaly scores generated by the base anomaly detection model 152 and the number of the weights may be different from the number of the sensor variables in the input vector (n).

In the described embodiment, the base anomaly detection model 152 have architectures of proximity-based anomaly detection model using sparse structure learning. Each vector in the sequence of the driving data includes a plurality of recorded values and/or processed values obtained at different timings (e.g., t, t−1 . . . ), thus the time context is taken into account.

The proximity-based anomaly detection model is a model based on a hypothesis that a certain correlation is established between sensors in a normal state and is collapsed in an anomalous state. The proximity-based anomaly detection model learns behavior of sensors in normal state.

The base anomaly detection model 152 includes a variable dependency model such as graphical gaussian model (GGM) that can be trained sparsely with a driving data believed to be normal. The variable dependency model calculates a correlation anomaly score for each sensor variable as the temporary anomaly scores from sensor variables. The variable dependency model has learnable parameters, which are optimized by the model training module 110 with the set of the normal driving data stored in the driving data store 112.

Figure 3:
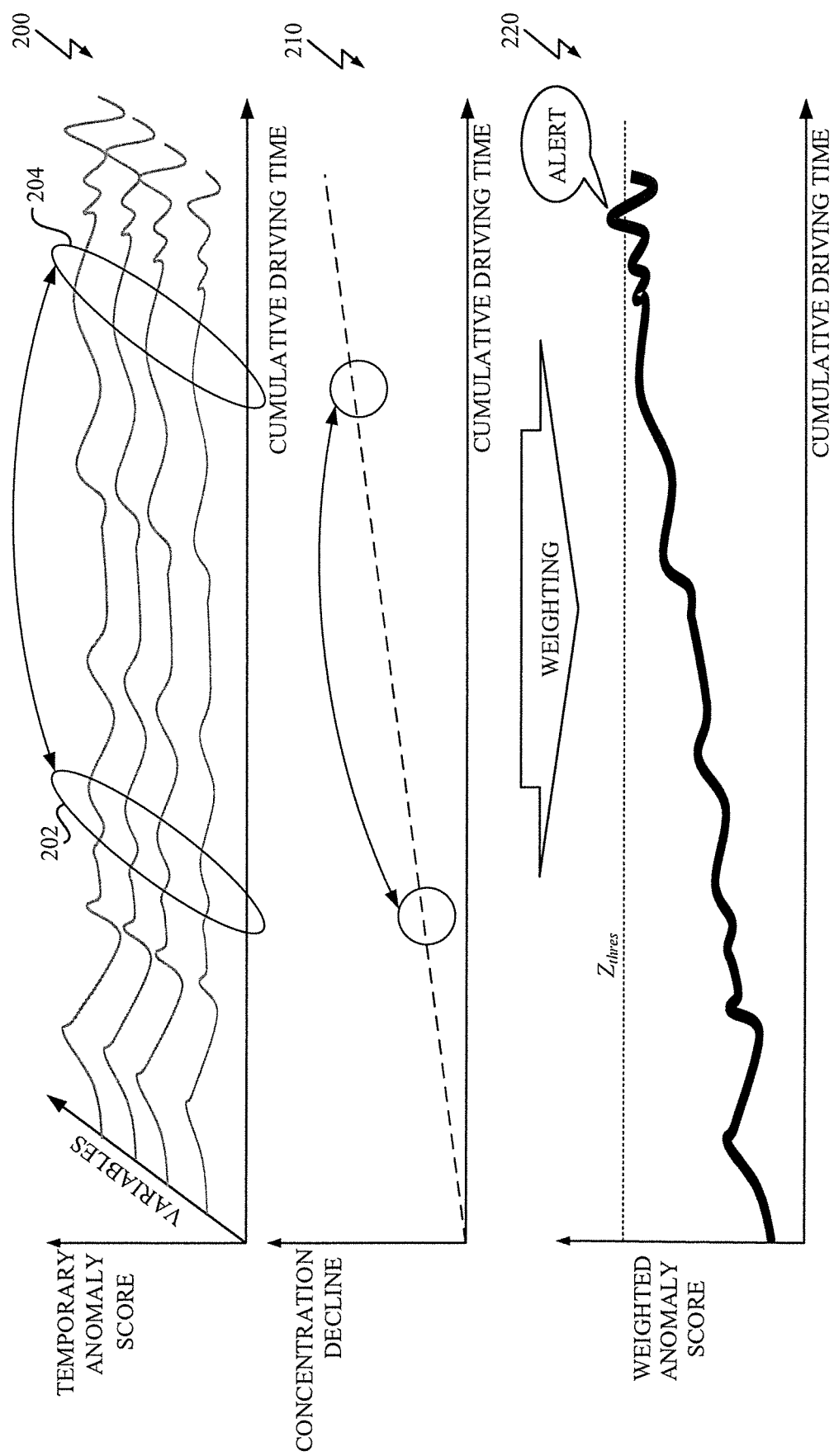
FIG. 3 depicts schematics of time series for each temporary anomaly score and a weighted anomaly score computed for driving data according to the exemplary embodiment of the present invention.

Referring to FIG. 3, a schematic of time series of anomaly scores computed for driving data is described. In FIG. 3, there are three graphs 200, 210, and 220. As shown in the first graph 200 of FIG. 3, there is a plurality of time series of the temporary anomaly scores that are computed by the base anomaly detection model 152. As depicted in the first graph 200 of FIG. 3, there is a relatively large background fluctuation that would relate to changes in driving environment such as a curve, left turn, road condition, etc., in the time series of the temporary anomaly scores. It is difficult to find clear sign indicating the concentration decline of the driver in the time series of the temporary anomaly score.

In order to reveal unclear sign of the driver's concentration decline in the time series of the anomaly score, a weighted anomaly score calculated from a set of temporary anomaly scores is defined as a final score indicating the estimation of the driver's concentration decline. The weights are adjusted so as to reveal the unclear sign of the driver's concentration decline in the time series of the weighted anomaly score as an optimization problem.

To optimize the weights, it is assumed that the concentration decline of the driver is gradually accumulated over time during driving due to tiredness or drowsiness, as illustrated in the second graph 210 of FIG. 3. Even though the magnitude and order relationship would collapse frequently, however, the concentration decline tends to roughly increase due to accumulation of fatigue when comparing at two points of time 202, 204 in one driving episode.

The weight optimization module 130 is configured to optimize the parameters of the weighted anomaly detection model 150 using the set of the training data under the aforementioned assumption. More specifically, the weights ($w = \{w_1, w_2, \ldots, w_n\}$) of the weighting part 156 are optimized by giving a penalty in the optimization problem when the weighted anomaly score calculated for a point of time with longer cumulative driving is lower than the weighted anomaly score calculated for a point of time with shorter cumulative driving.

In the described embodiment, the cumulative driving is measured by driving time from the start of driving to a given point of time. The driving time at two points of time may be comparative by a timestamp or an index associated with the vector in the sequence of one driving data.

In FIG. 3, the third graph 220 shows a schematic of time series of weighted anomaly score resulted from the plurality of the temporary anomaly scores computed for the driving data. By optimizing the weights (w) so as to make the weighted anomaly score for the longer cumulative driving time high as compared to the shorter cumulative driving time, the time series of the weighted anomaly score is expected to show a tendency to rise roughly with time even with slight increases and decreases.

The optimization problem of the weights (w) is a task of distinguishing positively affecting variables (that is considered to be more sensitive to driver's fatigue) and negatively (reversely) affecting variables (that is consider to have a larger relationship with other driving characteristic such as difference of driving routes, driving tendency by the individual driver rather than the driver's fatigue) from among all the temporary anomaly scores of the sensor variables. If it is assumed that the adjusted weights are coincided to the domain knowledge, the sensor variables related to the speed and jolt, which are related to accelerating and braking work of the driver, would be assigned higher weights. Also, the sensor variables related to the latitude and longitude, which are related to the difference of the driving route, would be assigned lower weights. The sensor variables related to the steering angle and the Y-axis acceleration, which are related to the driving tendency by the individual driver, would be assigned lower weights.

Since it is too resource intensive to process all the combination of two points of time in every training data during the weight optimization when the amount of the training data is huge, the weights are preferable optimized sequentially by sampling randomly a pair of two different points of time in one training data randomly selected from among the set of the training data. In a particular embodiment, stochastic gradient descent (SGD) is used for performing the weight optimization efficiently. In the described particular embodiment, each pair of two different points of time in one training data is preferably sampled for the weight optimization. However, in other embodiment, a pair of two different points of time over a plurality of different training data of the same driver or different drivers may also be sampled.

In the third graph 220 of FIG. 3, the threshold ($Z_{thres}$) with respect to the weighted anomaly score ($z^{\{t\}}$) is also depicted. As shown in the third graph 220 of FIG. 3, if it is determined that the weighted anomaly score ($z^{\{t\}}$) exceeds the threshold ($Z_{thres}$), the output device 104 would issue or report an alert to indicate the possibility of the driver's concentration decline at a point of time of detection. In the described embodiment, the threshold ($Z_{thres}$) is a detection condition related to the weighted anomaly score that indicates the occurrence of the concentration decline for the input driving data when it is satisfied.

The threshold ($Z_{thres}$) and/or hyper-parameters of the weighted anomaly detection model 150 may be determined in a manner based on a cross-validation technique, in which partitioning a sample of selected driving data into two subsets, training the models on one subset (training set) and validating the models on the other subset (validation set) are repeatedly performed with different thresholds ($Z_{thres}$) and/or hyper-parameters and the system selects ones that maximize a thres, metric such as accuracy, precision, recall, specificity, F-measure depending on an application.

The hyper-parameters of the weighted anomaly detection model 150 may include a hyper-parameter of the base anomaly detection model 152, a hyper-parameter of the weight optimization and/or the data selection condition for selecting training data (e.g., the threshold for the driving time, a condition with respect to time of day, a combination of training data itself, etc.), and may be determined by the cross-validation technique.

Figure 4:
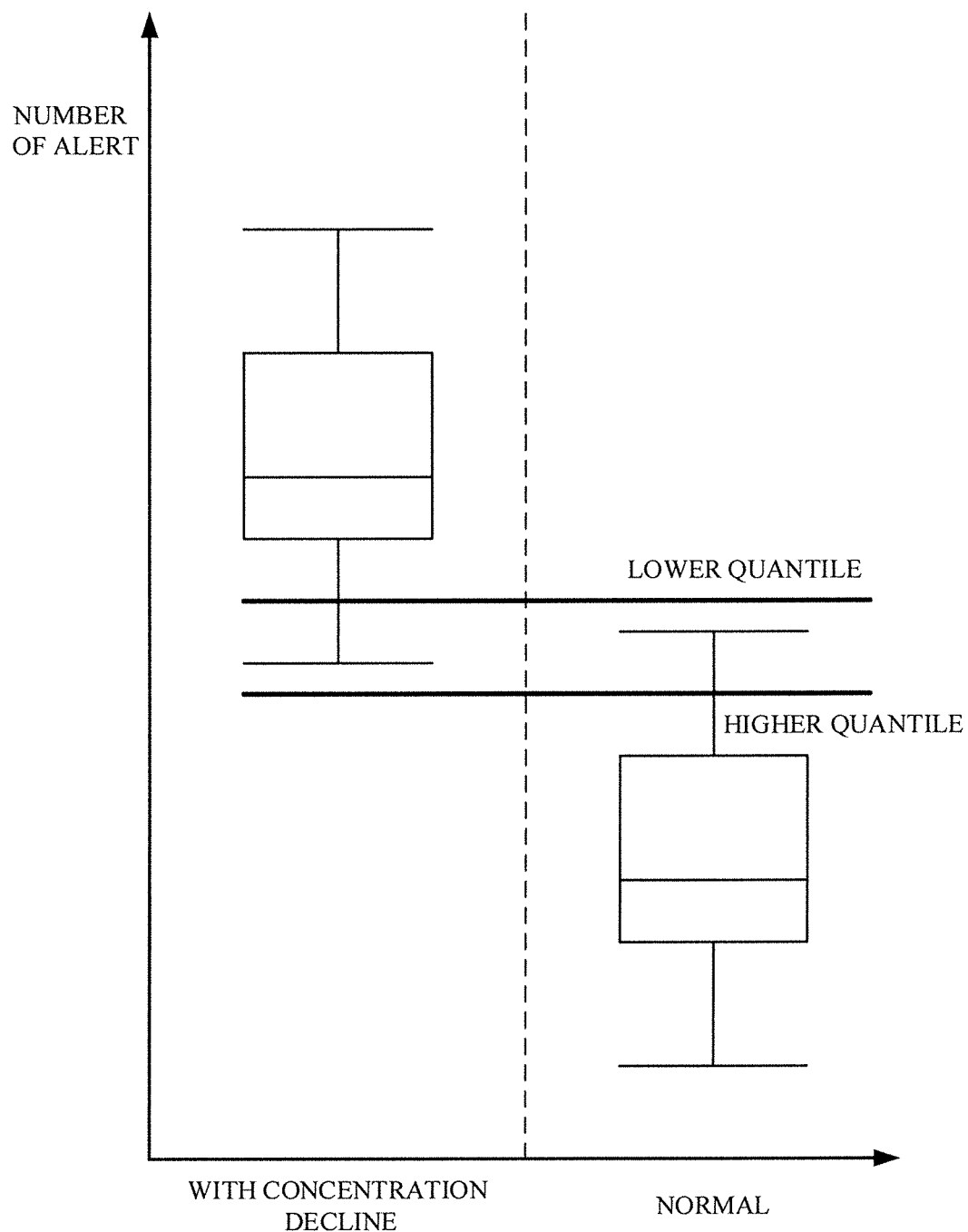
FIG. 4 depicts schematics of comparison between distributions for driving data with a concentration decline and normal driving data.

FIG. 4 depicts schematics of comparison between distributions for driving data with concentration decline and normal driving data without any concentration decline. The distributions shown in FIG. 4 may be obtained from the validation set. The vertical axis represents the number of the alerts per minute in the driving data (the number of the alerts/the length of the driving time) to mitigate the effect of the length of the driving.

When the lower quantile (e.g., 0.2 quantile) of the number of the alerts per minute in the driving data with the concentration decline is higher than the higher quantile (e.g., 0.8 quantile) of the alerts per minute in the normal driving data, it can be said that the concentration decline detection module 140 alerts in the most of the driving data with concentration decline while not alerting in the most of the normal driving data. Hence, by optimizing the threshold ($Z_{thres}$) and/or thres, the hyper-parameters of the weighted anomaly detection model 150, the lower quantile (e.g., 0.2 quantile) for the driving data with the concentration decline preferably becomes higher than and is apart from the higher quantile (e.g., 0.8 quantile) for the normal driving data in terms of the number of the alert per minute.

Also in the described embodiment, the concentration decline detection module 140 is described to perform a simple binary classification using the threshold ($Z_{thres}$). Such a simple mechanism to obtain a result as to whether a driver's concentration decline is detected or not is preferred for real-time detection, especially in in-vehicle devices that have generally limited computational resources. Also the thresholds ($Z_{thres}$) may be set arbitrarily in such the simple mechanism.

However, in other embodiments where computational resource constraints are relatively more relaxed in comparison with aforementioned case, not only a simple binary classification but also more sophisticated classification models including an artificial neural network that uses the weighted anomaly score (and optionally the temporary anomaly scores) as at least a part of input features for the subsequent classification are contemplated.

Note that the architecture of the anomaly detection model used as the base anomaly detection model 152 is not limited to the aforementioned proximity-based anomaly detection model. Other anomaly detection model such as dynamic Boltzmann machine may also be employed.

Also note that in the described embodiment, the weighted anomaly detection model 150 is described to have the base anomaly detection model 152 and the weighting part 156 with the weights (w). However, in other embodiment, instead of including the weighting part 156, a more sophisticated model such as an artificial neural network that uses the temporary anomaly scores as at least a part of input features and calculates a probability of anomaly as a final score may be included in the weighted anomaly detection model 150. In further other embodiment, the weighted anomaly detection model 150 may be a model that directly computes a final score indicating an estimation of a concentration decline of the target driver from input driving data ($s^{\{t\}}$) with its parameters that are optimized by the weight optimization module 130 with the set of the training data under the aforementioned assumption. In this embodiment, initial parameters are given as a base of an anomaly detection model for generating the final score.

In particular embodiments, each of modules 110, 120, 130 and 140 and models 150 described in FIG. 1 may be implemented as, but not limited to, a software module including instructions and/or data structures in conjunction with hardware components such as a processor, a memory, etc.; a hardware module including electronic circuitry; or a combination thereof. These modules 110, 120, 130 and 140 and the model 150 described in FIG. 1 may be implemented on a single computer system such as a personal computer, a server machine and a microcontroller of an apparatus such as an automobile and an automotive equipment, or over a plurality of devices such as a client server system, an edge computing system, a computer cluster in a distributed manner. Also the driving data store 112 may be provided by using any internal or external storage device or medium to which the system 100 has an access.

Figure 5:
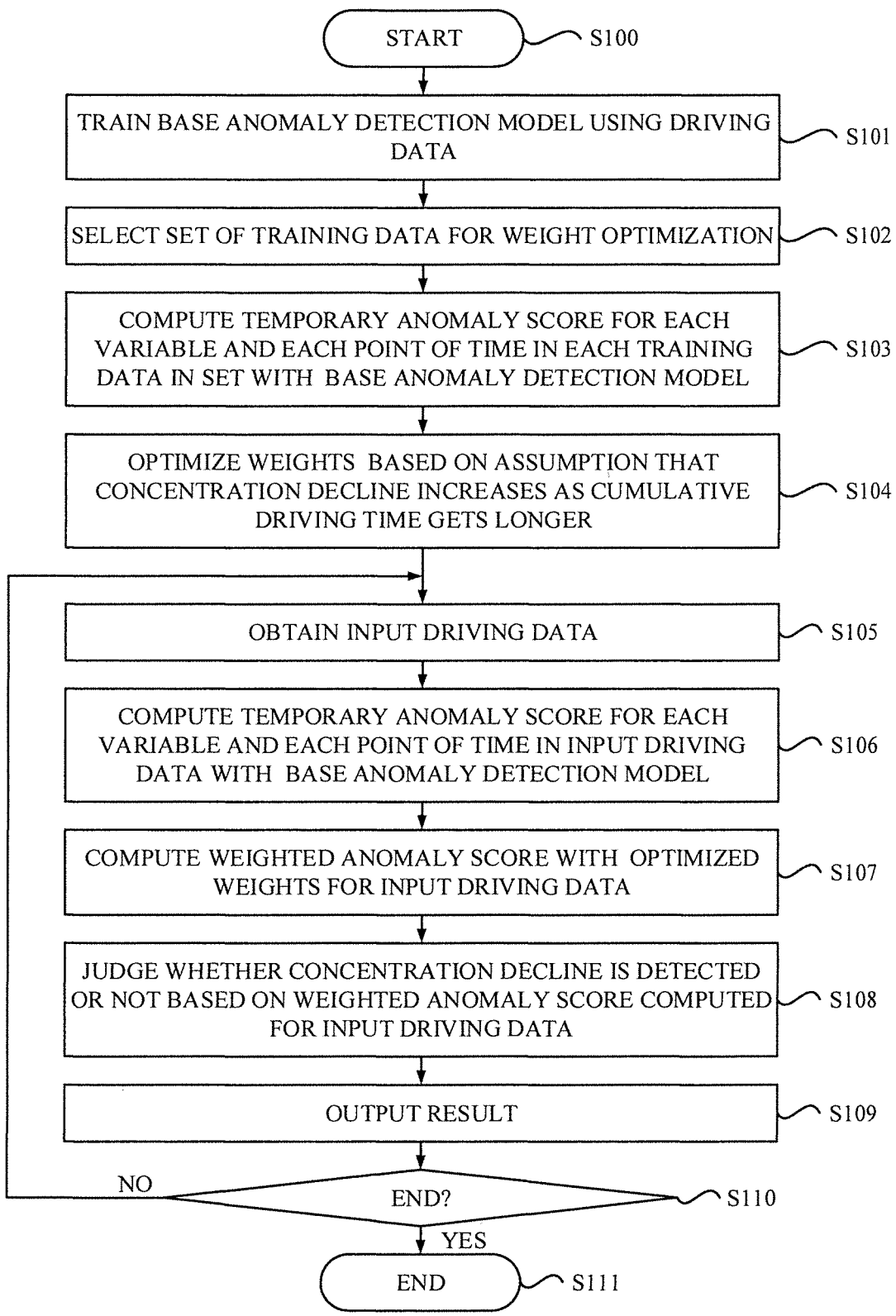
FIG. 5 is a flowchart depicting a process for detecting a concentration decline of a target driver according to an exemplary embodiment of the present invention.

Hereinafter, referring to a flowchart shown in FIG. 5, a process for detecting a concentration decline of a target driver according to an exemplary embodiment of the present invention is described. Note that the process shown in FIG. 5 may be performed by processing circuitry that implements the system 100 (the modules 110, 120, 130, 140 and the models 150) shown in FIG. 1. The process shown in FIG. 5 may begin at step S100 in response to a request or an event for initiating the concentration decline detection.

At step S101, the processing circuitry may train, by the model training module 110, an anomaly detection model with the collection of the driving data stored in the driving data store 112 to prepare a base anomaly detection model 152 for generating temporary anomaly scores for plural sensor variables. After completion of training, the parameters of the base anomaly detection model 152 may be stored into an appropriate storage device. When the base anomaly detection model 152 has already been trained before this process, the base anomaly detection model 152 may be prepared by reading contents (the parameters) of the base anomaly detection model 152 that has already been trained with the collection of the driving data.

At step S102, the processing circuitry may select, by the training data selection module 132, a set of driving data from among the driving data stored in the driving data store 112 to prepare a set of training data for weight optimization. The set of the training data may be selected in a manner based on a data selection condition for extracting a driving episode that includes driving at the time of the concentration decline. A set of driving data with explicit or implicit record of indicating concentration decline (e.g., tiredness, drowsiness) is selected for the weight optimization of the weighted anomaly detection model 150.

At step S103, the processing circuitry may compute temporary anomaly score for each sensor variable and each point of time ($x^{\{t\}}$) in each training data in the selected set by using the base anomaly detection model 152.

At step S103, the processing circuitry may optimize, by the weight optimization module 130, weights (w) of the weighted anomaly detection model 150 based on the assumption that the concentration decline increases as the cumulative driving time gets longer. The objective function of the weight optimization problem with respect to the weights (w) is represented as follows:

$$\min_w \frac{1}{N}\left(\sum_{t,u} \max(0, 1 - \text{sign}(t-u)(w^T x^{\{t\}} - w^T x^{\{u\}}))\right) + \lambda \|w\|^2,$$

where a pair of t and u represents a pair of two points of time in one training data, a pair of $x^{\{t\}}$ and $x^{\{u\}}$ represents a pair of corresponding two sets of temporary anomaly scores for plural sensor variables, N denotes the number of the pairs and λ represents a regularization parameter.

In the aforementioned objective function, the first term represents a penalty term that give a penalty when a weighted anomaly score ($w^T x^{\{t\}}$) calculated for a point of longer cumulative driving time is lower than a weighted anomaly score ($w^T x^{\{u\}}$) calculated for a point of shorter cumulative driving time ($w^T x^{\{t\}} < w^T x^{\{u\}}$ in the case where t>u and $w^T x^{\{t\}} > w^T x^{\{u\}}$ in the case where t<u). In a preferable embodiment, the weights (w) are optimized by sampling randomly a pair of weighted anomaly scores ($w^T x^{\{t\}}$, $w^T x^{\{u\}}$) generated for different timings (t, u) in one training data randomly selected from among the selected set of the training data. In a particular embodiment, stochastic gradient descent (SGD) is used for the efficient weight optimization. The second term represents a regularization term to keep the weights (w) small, making the model simpler and avoiding overfitting.

In the described embodiment, the objective function is a hinge loss function that gives a penalty of zero if it has correct prediction with enough margin. However, in other embodiment, other cost function may also be employed. In further other embodiment, the objective function may be defined as a reward function to be maximized instead of using the cost function to be minimized. After completion of the weight optimization, the optimized weights of the weighted anomaly detection model 150 may be stored into an appropriate storage device.

When the weights of the weighted anomaly detection model 150 has been optimized before this process, the weights may be prepared by reading contents (the weights) of the weighted anomaly detection model 150 that has already been optimized with the set of the training data selected by the training data selection module 132.

At step S105, the processing circuitry may receive input driving data ($s^{\{t\}}$) that includes a sequence of sensor data relating to driving performed by a target individual. In a particular embodiment where the real-time detection is performed and the time context is taken into account, a currently arriving part received from the input acquisition module 120 is incorporated as a part of input driving data. Alternatively, only a currently arriving part received from the input acquisition module 120 is used. In a particular embodiment, the input driving data is given as a complete episode including a sequence of vectors from a start of driving to an end of the driving. The input driving data may be received from the input acquisition module 120 by acquiring sensor signals of the sensors 102. Alternatively, the input driving data may be received from a driving recorder or an automobile through a network (e.g., a mobile network and internet). Alternatively, the input driving data may be received by reading the input driving data from a storage medium that stores the input driving data.

At step S106, the processing circuitry may compute temporary anomaly score for each sensor variable and each point of time ($x^{\{t\}}$) in the input driving data with the base anomaly detection model 152.

At step S107, the processing circuitry may compute, by the concentration decline detection module 140, a weighted anomaly score ($z^{\{t\}}$) for each point of time in the input driving data from the set of the temporary anomaly scores ($x^{\{t\}}$) with the optimized weights (w) of the weighted anomaly detection model 150. The weighted anomaly score is generated as a weighted sum of the temporary anomaly scores of the plural sensor variables with the weights ($z^{\{t\}} = w^T x^{\{t\}}$).

At step S108, the processing circuitry may judge, by the concentration decline detection module 140, whether a concentration decline is detected or not in a manner based on the weighted anomaly score ($z^{\{t\}}$). The judgement as to whether the driver' concentration decline is detected or not may be performed as follows:

$$\text{Driver's Concentration Decline} = \begin{cases} \text{True}, & \text{if } z^{\{t\}} > Z_{thres} \\ \text{False}, & \text{if } z^{\{t\}} \leq Z_{thres} \end{cases}.$$

At step S109, the processing circuitry may output, by the output device 104, a result based on the score ($z^{\{t\}}$), which indicates a driver's concentration decline when the detection condition is satisfied (Driver's Concentration Decline=True) and a no concentration decline when the detection condition is not satisfied (Driver's Concentration Decline=False).

At step S110, the processing circuitry may determine whether the process ends or not. If the processing circuitry determines that the process is not ended in step S110, the process may loop back to step S105 for a subsequent part of the input driving data or other input driving data. On the other hand, if the processing circuitry determines that the process is ended in step S110, the process may proceed to step S111 to end the process.

In the process for detecting the concentration decline of the target driver, there are three phases: (i) a training phase of the base anomaly detection model 152 (S101), (ii) a weight optimization phase (S102-S104) and (iii) an inference phase where the concentration decline detection is performed using the trained base anomaly detection model 152 and the optimized weights (S105-S110). In the aforementioned embodiment, three phases have been described to be performed by the same processing circuitry. However, the training phase of the base anomaly detection model 152 (S101), the weight optimization phase (S102-S104) and the inference phase (S105-110) may be performed by different processing circuitry. For example, the training phase and the optimization phase may be performed on a computer system at a side of a vender of an apparatus (e.g., a driving recorder) and the inference phase is performed on a computer system at a side of a user of the apparatus.

Figure 6:
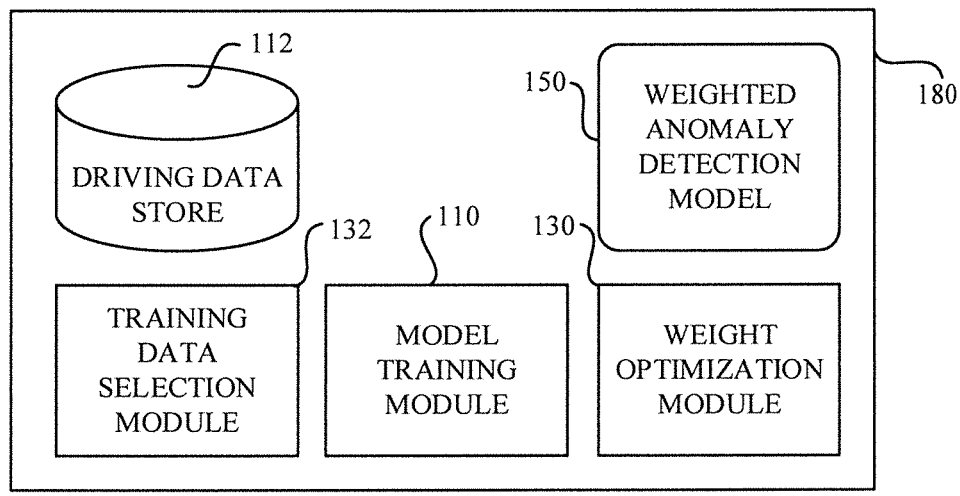
FIG. 6 describes a schematic of a system including an automobile and a center computer system, in which the driver concentration decline detection system is implemented, according to a particular embodiment of the present invention.
Figure 6:
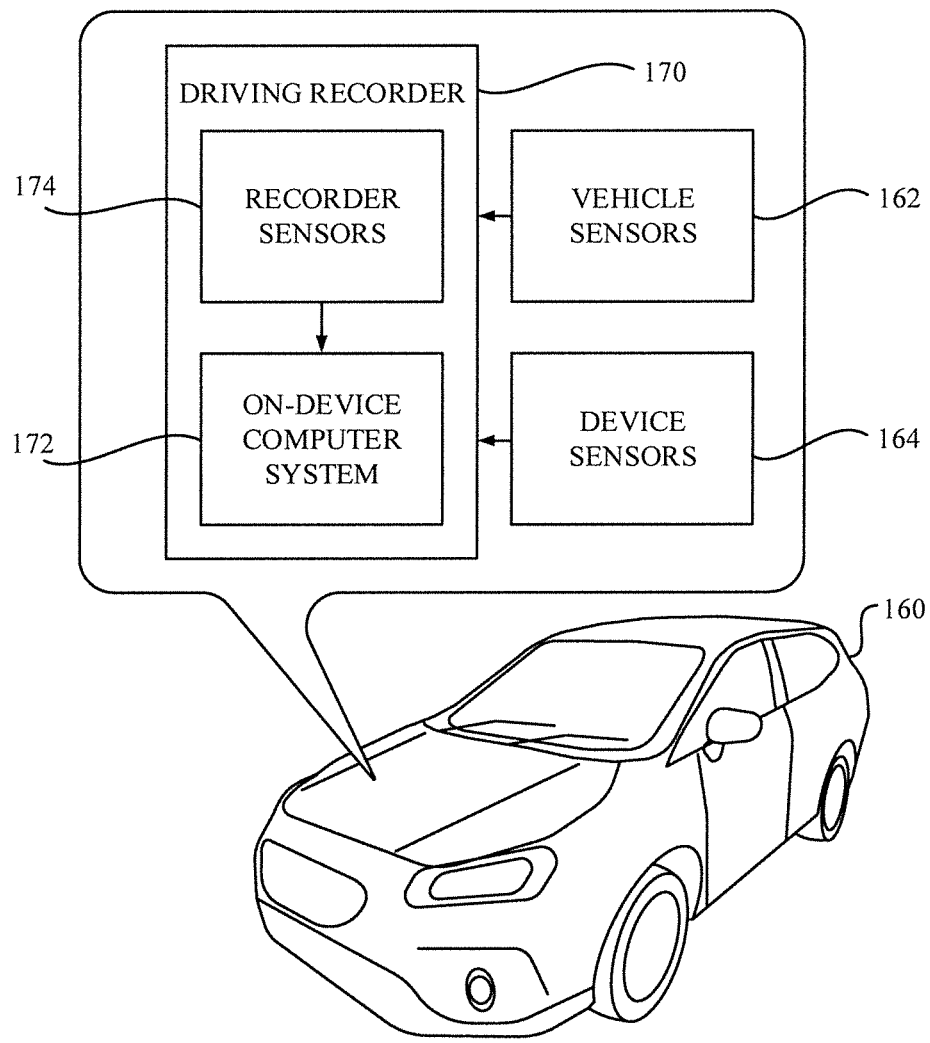
Figure 7:
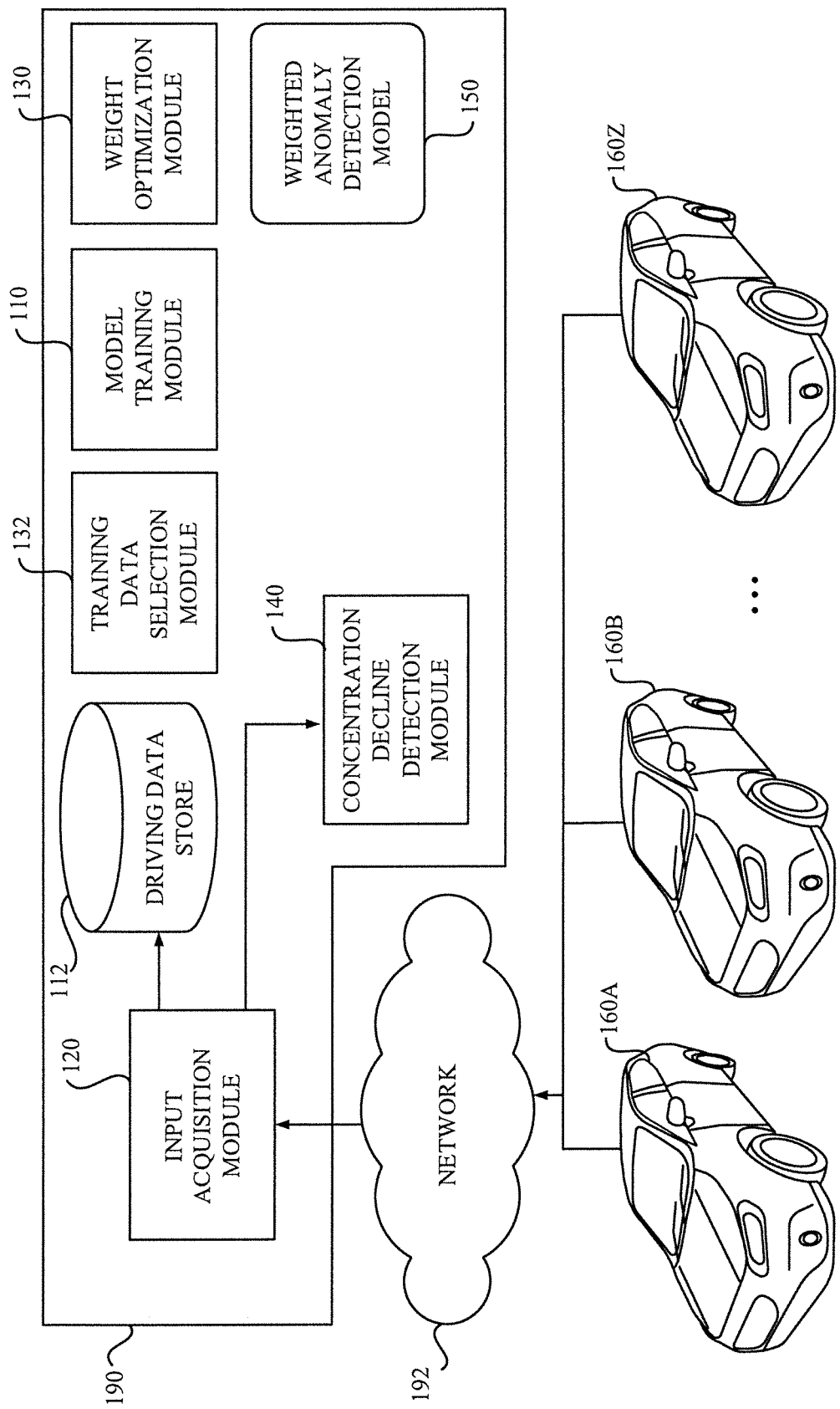
FIG. 7 describes a schematic of an automobile monitoring system for monitoring a plurality of automobiles, in which the driver concentration decline detection system is implemented, according to other particular embodiment of the present invention.

With reference to FIG. 6 and FIG. 7, schematics of a system including an automobile and a center computer system and an automobile monitoring system, in which the driver concentration decline detection system 100 is implemented, according to one or more particular embodiments of the present invention are described.

FIG. 6 describes a schematic of a system including an automobile 160 and a center computer system 180, in which the driver concentration decline detection system 100 is implemented. The automobile 160 is equipped with a driving recorder 170; vehicle sensors 162 and device sensors 164. The vehicle sensors 162 may include any sensors equipped in the automobile 160 in relation to its vehicle control system. The device sensors 164 may include any sensors that are implemented in automotive equipment such as a car navigation system, ETC (Electronic toll collection) unit, etc., which are equipped in the automobile 160.

The driving recorder 170 may include recorder sensors 174, including any sensors implemented in the driving recorder 170 itself, and an on-device computer system 172 that implements at least the model 150 and the modules 120, 140 shown in FIG. 1.

The driving recorder 170 may acquire sensor signals originating from the recorder sensors 174, the vehicle sensors 162 and the device sensors 164. The sensors 102 shown in FIG. 1 may include any one of the recorder sensors 174, the vehicle sensors 162 and the device sensors 164.

In the particular embodiment shown in FIG. 6, major components of the driver concentration decline detection system 100 for the inference phase, which includes the input acquisition module 120, the concentration decline detection module 140 and the weighted anomaly detection model 150, may be implemented in the automobile 160, as indicated by a dashed line in FIG. 1. The major components of the driver concentration decline detection system 100 for the training phase of the base anomaly detection model 152 and the weight optimization phase, which includes the model training module 110, the driving data store 112, the training data selection module 132 and the weight optimization module 130, may be implemented in the central computer system 180 at a side of a vender of the driving recorder 170. However, in other particular embodiment where the weighted anomaly detection model 150 is customized for a specific target driver in the local environment, at least the driving data store 112 that stores a plurality of driving data obtained from the target driver, the training data selection module 132 and the weight optimization module 130 may be implemented at a side of a user of the driving recorder (the automobile). The model training module 110 may also be implemented at the side of the user of the driving recorder (the automobile).

Although the on-device computer system 172 that implements the major components of the driver concentration decline detection system 100 for the inference phase is described with reference to FIG. 6, however, computer systems for the inference phase is not limited to the aforementioned on-device computer system 172 of the driving recorder 170. The computer system may be an in-vehicle computer system of a vehicle control system of the automobile 160, an on-device computer system of other automotive equipment such as car navigation system and infotainment system, and a mobile computer system such as a smartphone or tablet computer that is brought into the automobile 160, to name but a few.

FIG. 7 describes a schematic of an automobile monitoring system 190, in which the driver concentration decline detection system 100 is implemented. As shown in FIG. 7, there is a plurality of automobiles 160A-160Z to be monitored by the automobile monitoring system 190. Each automobile 160 is configured to communicate with the automobile monitoring system 190 via a network 192 including a wireless network such as mobile network, a sensor network, etc. Each automobile 160 (or its equipment mounted thereon) transmits sensor signals that are acquired from the sensors equipped in the automobile 160 to the automobile monitoring system 190 via the network 192. A part of the driving data recorded with a predetermined recording frequency is transmitted to the automobile monitoring system 190 with a predetermined transmitting interval.

The input acquisition module 120 may collect the sensor signals from the plurality of the automobiles 160A-160Z and store the driving data into the driving data store 112. The driving data collected in the driving data store 112 is used by the model training module 110 and/or the weight optimization module 130 to train the base anomaly detection model 152 and/or to optimize weight of the weighted anomaly detection model 150.

In the particular embodiment shown in FIG. 7, major components of the driver concentration decline detection system 100 except for the sensors 102 may be implemented in the automobile monitoring system 190 as indicated by a dot line in FIG. 1. Each automobile 160A-160Z may have the sensors 102 and a transmitting device for transmitting the sensor data to the automobile monitoring system 190.

Although the automobile monitoring system 190 that implements the major components of the driver concentration decline detection system 100 and receives the sensor data from the plurality of the automobile 160 is described with reference to FIG. 7, however, computer systems for detecting a concentration decline of a target driver is not limited to the aforementioned automobile monitoring system 190. The computer system may be any general computer system connected to one or more automobiles through a network, or any general computer that has an access to a storage medium that stores input driving data, which may be removed from a storage media slot of the driving recorder, for example.

According to one or more embodiments of the present invention, a novel technique capable of detecting a concentration decline of a target individual based on anomaly detection model is provided.

The novel technique does not needs a camera (facial image) and uses only recorded values from sensors that are generally available in a modern automobile or its standard equipment. The usage of recorded values of the sensors would make the detection possible with a low cost.

There are potentially two naive approaches; one is based on standard anomaly detection and other is based on classification. However, both of these approaches are not effective as described below.

In one approach, the problem for detecting the concentration decline may be formulized as a standard anomaly detection where a detected anomaly is considered as the time point of the concentration decline. In this approach, the anomaly detection model can be trained with a set of normal driving data since it is possible to collect normal driving data even if a few anomaly parts are included. However, in this approach, a lot of anomaly, which would be irrelevant to the concentration decline of the driver, is detected and it is difficult to discriminate an anomalous region that is due to the driver's concentration decline (e.g., tiredness and drowsiness) from other anomalous region that is irrelevant to the concentration decline and would be due to change of the road environment (e.g., a difference in level of a road surface).

In other approach, the problem for detecting the concentration decline may be formulized as a classification task. However, in this approach, it is difficult to prepare precise correct label information discriminating an anomalous region where the driver feels concentration decline from normal regions where the driver does not feel any concentration decline since it is difficult for drivers to recognize their own concentration decline precisely during the driving.

Also, in this approach, a classifier can be trained with a set of training data by assuming a driving episode that contains an anomalous region where the driver feels concentration decline at least in part as a positive example and a driving episode that does not contain any anomalous region where the driver feels concentration decline as a negative example since it is possible to collect driving data including roughly the anomalous region. However, a result of such classifier does not represent an estimation of driver's concentration decline. It is unclear what the classifier discriminates. That is because driving data where the driver feels concentration decline over the entire period of the driving episode is rare as well as driving data where the driver does not feel the concentration decline over the entire period of the driving episode is also rare. Accordingly, the positive examples include an example that is supposed to be a negative example and the negative examples include an example that is supposed to be a positive example.

In contrast to the aforementioned approaches, according to the aforementioned embodiments, a practical solution for detecting a concentration decline of a target driver by using an anomaly detection model is provided in a manner based upon an assumption that a concentration decline of a driver is gradually accumulated over time during driving.

Hereinabove, the computer-implemented methods, the computer systems and the computer program products for detecting an concentration decline of a target individual from sensor data relating to activity performed by the target individual by using an anomaly detection model has been described, in which the concentration decline to be detected is a concentration decline of the target individual when driving an automobile and the activity reflected in the sensor data is driving performed by the target individual as a driver. The aforementioned features of the computer-implemented methods, the computer systems and the computer program products are preferable for detecting the concentration decline during the driving since fatigue of an individual would be accumulated over time by tasks that need concentration power of the individual and the driving is one such task.

However, the computer-implemented methods, the computer systems and the computer program products according to one or more embodiments of the present invention are not limited to the aforementioned driver concentration decline detection systems, processes and program products. The apparatus to be driven is not limited to the automobile. In other embodiments, the apparatus may be any other self-propelled vehicles such as trucks (or lorries), buses, motorcycles (or two- or three-wheeled motor vehicle), heavy-duty vehicles (including heavy equipment), snowmobiles, watercraft, aircraft, etc. In further other embodiment, the apparatus to be driven may be a human-powered vehicle such as bicycles.

In the aforementioned embodiment, the activity has been described to be driving of the vehicle. However, the activity is not limited to the driving of the vehicle by the target individual as long as the activity is reflected in the sensor data. An operation of an apparatus other than the driving of the vehicle may also be targeted. The apparatus to be operated may not be limited to a vehicle, other types of apparatus having a mechanism that needs a person to operate via an appropriate interface (e.g., a handle, a shift, a pedal, a lever, dial, knob, switch, a key, etc.) so as to control a motion related to the apparatus (e.g., apparatus itself, a part of the apparatus) or manipulate an operational state of the apparatus are also contemplated.

Furthermore, in further other embodiment, activity other that the operation of the apparatus may also be targeted as long as the activity performed by the individual is reflected in the sensor data and the activity relates a task that needs individual's concentration power since continuation of such task would result in mental/physical fatigue to some extent.

Having described the advantages obtained with respect to the one or more specific embodiments according to the present invention, it should be understood that some embodiments may not have these potential advantages and these potential advantages are not necessarily needed of all embodiments.

Computer Hardware Component

Figure 8:
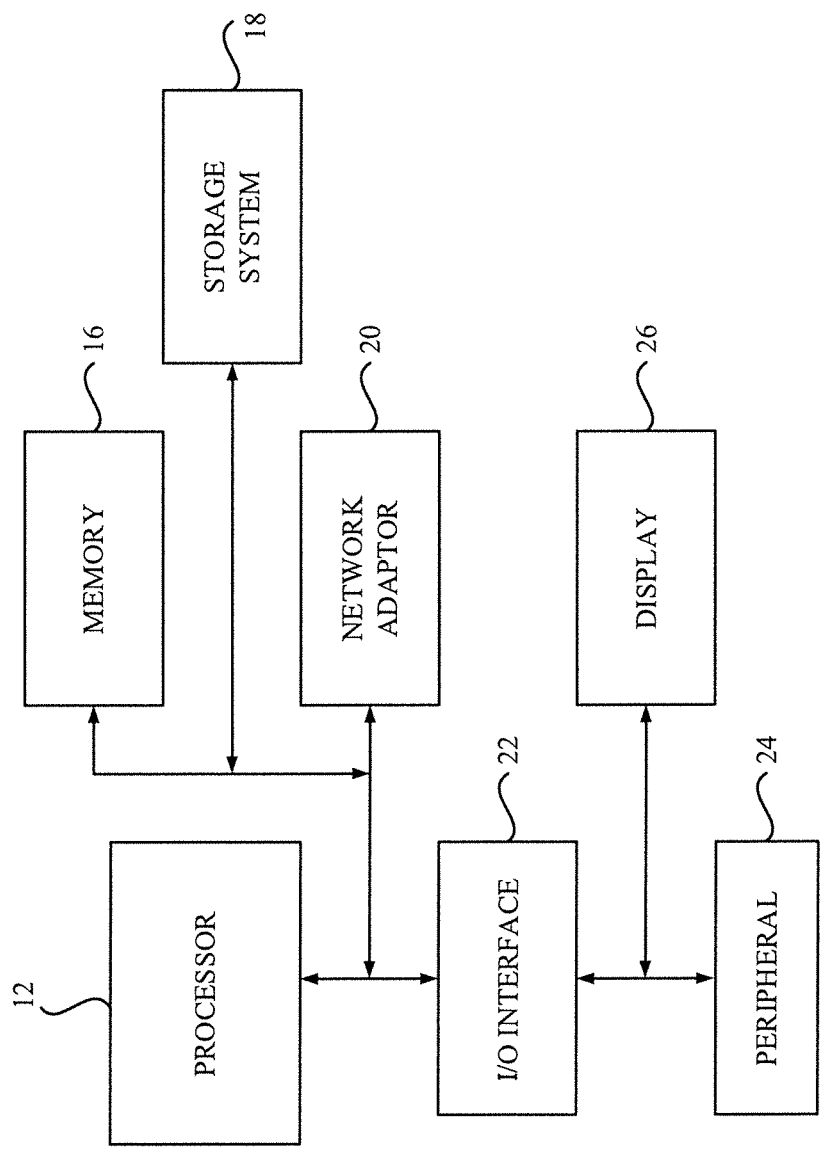
FIG. 8 depicts a computer system according to one or more embodiments of the present invention.

Referring now to FIG. 8, a schematic of an example of a computer system 10, which can be used for implementing the driver concentration decline detection system 100 (e.g., the on-device computer system 172, the center computer system 180 or the automobile monitoring system 190), is shown. The computer system 10 shown in FIG. 8 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to, microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   preparing a base of an anomaly detection model for generating a score indicating an estimation of a concentration decline, the anomaly detection model having parameters affecting the score;
   preparing a set of training data each including a sequence of sensor data relating to an activity performed by an individual;
   optimizing the parameters of the anomaly detection model using the set of the training data so as to make a score for longer cumulative activity high as compared to shorter cumulative activity; and
   outputting the parameters of the anomaly detection model, the anomaly detection model having the parameters being used for detecting a concentration decline of a target individual.

2. The method of claim 1, wherein the anomaly detection model having the parameters is configured to calculate a score for input data including sensor data relating to the activity performed by the target individual.

3. The method of claim 1, wherein the anomaly detection model is prepared by training the anomaly detection model with a collection of activity data, the anomaly detection model comprising a base part for computing temporary scores for plural sensor variables and a weighting part for weighting the temporary scores for the plural sensor variables to generate the score as a weighted sum of the temporary scores of the plural sensor variables with the parameters as weights.

4. The method of claim 3, wherein the activity performed by the individual is driving performed by the individual as a driver and the concentration decline of the target individual detected by the anomaly detection model relates to driving of a motor vehicle by the target individual.

5. The method of claim 4, wherein cumulative activity is measured by driving time or driving distance.

6. The method of claim 1, wherein the parameters of the anomaly detection model are optimized by giving a penalty when a first score calculated for a point of longer cumulative activity is lower than a second score calculated for a point of shorter cumulative activity.

7. The method of claim 1, wherein the parameters of the anomaly detection model are optimized by sampling randomly a pair of scores generated for different timings in one training data selected from among the set of the training data.

8. The method of claim 1, wherein the set of the training data is prepared by selecting one or more activity data based on a data selection condition for extracting an episode including activity at the time of the concentration decline.

9. The method of claim 1, wherein each of the training data includes a sequence of vectors each including a plurality of values selected from a group comprising accelerations of x, y and z axes, angular velocities of roll, pitch and yaw axes, a vehicle speed, a vehicle heading angle, a steering angle, latitude, longitude, height, an azimuth, a depression amount and a depression velocity of an accelerator pedal, a position of a throttle valve, a depression amount and a depression velocity of a brake pedal, and processed values obtained therefrom.

10. The method of claim 1, wherein the anomaly detection model have architectures of proximity-based anomaly detection model using sparse structure learning.

11. A computer-implemented method comprising:
preparing an anomaly detection model for generating a score indicating an estimation of a concentration decline, the anomaly detection model having parameters affecting the score, the parameters having been optimized with a set of training data so as to make a score for longer cumulative activity high as compared to shorter cumulative activity;
receiving input data including sensor data relating to an activity performed by a target individual;
calculating a score for the input data using the anomaly detection model having the parameters; and
outputting a result based on the score.

12. The method of claim 11, wherein the result indicates occurrence of concentration decline for the input data in response to a detection condition related to the score being satisfied.

13. The method of claim 12, wherein the detection condition includes a threshold with respect to the score, the threshold being set based on cross-validation.

14. The method of claim 11, wherein the anomaly detection model comprises a base part, for computing temporary scores for plural sensor variables, trained with a collection of activity data and a weighting part for weighting the temporary scores for the plural sensor variables to generate the score as a weighted sum of the temporary scores of the plural sensor variables with the parameters as weights.

15. The method of claim 11, wherein the activity performed by the target individual is driving performed by the target individual as a driver and the concentration decline of the target individual detected by the anomaly detection model relates to driving of a motor vehicle by the target individual.

16. A computer system comprising:
a memory tangibly storing program instructions;
a processor in communications with the memory, wherein the processor is configured, by executing program instructions, to:
prepare a base of an anomaly detection model for generating a score indicating an estimation of a concentration decline, wherein the anomaly detection model has parameters affecting the score;
prepare a set of training data each including a sequence of sensor data relating to an activity performed by an individual;
optimize the parameters of the anomaly detection model using the set of the training data so as to make a score for longer cumulative activity high as compared to shorter cumulative activity; and
output the parameters of the anomaly detection model, wherein the anomaly detection model having the parameters is used for detecting a concentration decline of a target individual.

17. The computer system of claim 16, wherein the anomaly detection model is prepared by training the anomaly detection model with a collection of activity data, the anomaly detection model comprising a base part for computing temporary scores for plural sensor variables and a weighting part for weighting the temporary scores for the plural sensor variables to generate the score as a weighted sum of the temporary scores of the plural sensor variables with the parameters as weights.

18. The computer system of claim 16, wherein the activity performed by the individual is driving performed by the individual as a driver and the concentration decline of the target individual detected by the anomaly detection model relates to driving of a motor vehicle by the target individual.

19. A computer program product comprising a computer readable storage medium having program instructions embodied therewith, the program instructions executable by a computer to cause the computer to perform the computer-implemented method of claim 1.

20. A computer program product comprising a computer readable storage medium having program instructions embodied therewith, the program instructions executable by a computer to cause the computer to perform the computer-implemented method of claim 11.

* * * * *